(12) United States Patent
Tauchi et al.

(10) Patent No.: US 8,470,426 B2
(45) Date of Patent: Jun. 25, 2013

(54) READ-ONLY OPTICAL INFORMATION RECORDING MEDIUM AND SPUTTERING TARGET FOR DEPOSITING REFLECTIVE FILM FOR THE OPTICAL INFORMATION RECORDING MEDIUM

(75) Inventors: Yuuki Tauchi, Kobe (JP); Yoko Shida, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 32 days.

(21) Appl. No.: 13/062,874

(22) PCT Filed: Sep. 11, 2009

(86) PCT No.: PCT/JP2009/065951
§ 371 (c)(1),
(2), (4) Date: May 27, 2011

(87) PCT Pub. No.: WO2010/030004
PCT Pub. Date: Mar. 18, 2010

(65) Prior Publication Data
US 2011/0222392 A1    Sep. 15, 2011

(30) Foreign Application Priority Data
Sep. 11, 2008    (JP) .................................. 2008-233917

(51) Int. Cl.
*G11B 7/24*  (2006.01)

(52) U.S. Cl.
USPC .................... 428/64.1; 428/64.4; 430/270.12

(58) Field of Classification Search
USPC ...................... 428/64.4; 430/270.12
See application file for complete search history.

(56) References Cited

U.S. PATENT DOCUMENTS

| | | | |
|---|---|---|---|
| 4,725,502 | A | 2/1988 | Kiyomiya et al. |
| 5,276,673 | A | 1/1994 | Kobayashi et al. |
| 5,643,650 | A | 7/1997 | Tawara et al. |
| 5,948,497 | A | 9/1999 | Hatwar et al. |

(Continued)

FOREIGN PATENT DOCUMENTS

| | | |
|---|---|---|
| JP | 62 137743 | 6/1987 |
| JP | 63 224050 | 9/1988 |

(Continued)

OTHER PUBLICATIONS

International Search Report issued Nov. 24, 2009 in PCT/JP09/65951 filed Sep. 11, 2009.

(Continued)

*Primary Examiner* — Elizabeth Mulvaney
(74) *Attorney, Agent, or Firm* — Oblon, Spivak, McClelland, Maier & Neustadt, L.L.P.

(57) ABSTRACT

Provided is a read-only optical information recording medium (for instance, a dual-layer BD-ROM), which uses blue laser and is provided with a reflecting film which has sufficiently high reflectivity while ensuring optical transparency required in manufacture, has excellent reproduction stability when used for an optical information recording medium and has excellent durability. The read-only optical information recording medium includes a structure wherein a plurality of laminated layers of the reflecting film and the optical transparent layer are formed on a substrate, and reproduces information by means of blue laser. The reflecting film closest to the substrate among the reflecting films is substantially composed of an Al-based alloy containing 0.5-3.0 atm % of Ti, and has a film thickness of 10 nm or more but not more than 30 nm.

11 Claims, 2 Drawing Sheets

U.S. PATENT DOCUMENTS

| | | | |
|---|---|---|---|
| 6,007,889 | A | 12/1999 | Nee |
| 6,229,785 | B1 | 5/2001 | Kitaura et al. |
| 6,280,811 | B1 | 8/2001 | Nee |
| 6,451,402 | B1 | 9/2002 | Nee |
| 6,689,444 | B2 | 2/2004 | Nakai et al. |
| 6,716,507 | B2 * | 4/2004 | Tabata ............... 428/64.1 |
| 6,788,635 | B1 * | 9/2004 | Aratani et al. .......... 369/100 |
| 7,022,384 | B2 | 4/2006 | Fujii et al. |
| 7,203,003 | B2 | 4/2007 | Nakai et al. |
| 7,419,711 | B2 | 9/2008 | Tauchi et al. |
| 7,452,604 | B2 | 11/2008 | Takagi et al. |
| 7,476,431 | B2 | 1/2009 | Tauchi et al. |
| 7,507,458 | B2 | 3/2009 | Takagi et al. |
| 7,514,037 | B2 | 4/2009 | Tauchi et al. |
| 7,517,575 | B2 | 4/2009 | Fujii et al. |
| 7,566,417 | B2 | 7/2009 | Tauchi et al. |
| 7,695,790 | B2 | 4/2010 | Tauchi et al. |
| 7,695,792 | B2 | 4/2010 | Tauchi et al. |
| 7,704,581 | B2 | 4/2010 | Takagi et al. |
| 7,713,608 | B2 | 5/2010 | Nakai et al. |
| 7,722,942 | B2 | 5/2010 | Tauchi et al. |
| 7,754,307 | B2 | 7/2010 | Tauchi et al. |
| 7,758,942 | B2 | 7/2010 | Tauchi et al. |
| 7,767,041 | B2 | 8/2010 | Takagi et al. |
| 7,776,420 | B2 | 8/2010 | Tauchi et al. |
| 7,790,263 | B2 | 9/2010 | Nakano et al. |
| 7,833,604 | B2 | 11/2010 | Tsubota et al. |
| 7,843,796 | B2 | 11/2010 | Sakamoto et al. |
| 7,871,686 | B2 | 1/2011 | Tauchi et al. |
| 2002/0034603 | A1 | 3/2002 | Nee |
| 2002/0122913 | A1 | 9/2002 | Nee |
| 2003/0138591 | A1 | 7/2003 | Nee |
| 2003/0215598 | A1 | 11/2003 | Nee |
| 2004/0018334 | A1 | 1/2004 | Nee |
| 2004/0151866 | A1 | 8/2004 | Nee |
| 2004/0151867 | A1 | 8/2004 | Nee |
| 2004/0191463 | A1 | 9/2004 | Nee |
| 2004/0238356 | A1 | 12/2004 | Matsuzaki et al. |
| 2004/0258872 | A1 | 12/2004 | Nee |
| 2005/0042406 | A1 | 2/2005 | Nee |
| 2005/0112019 | A1 | 5/2005 | Nakai et al. |
| 2005/0153162 | A1 | 7/2005 | Takagi et al. |
| 2005/0170134 | A1 | 8/2005 | Nee |
| 2006/0171842 | A1 | 8/2006 | Tauchi et al. |
| 2006/0177768 | A1 | 8/2006 | Tauchi et al. |
| 2008/0075910 | A1 | 3/2008 | Ohwaki et al. |
| 2009/0057140 | A1 | 3/2009 | Takagi et al. |
| 2009/0057141 | A1 | 3/2009 | Tauchi et al. |
| 2009/0139860 | A1 | 6/2009 | Matsuzaki |
| 2009/0155514 | A1 | 6/2009 | Sekiguchi et al. |
| 2010/0038233 | A1 | 2/2010 | Takagi et al. |
| 2010/0065425 | A1 | 3/2010 | Matsuzaki et al. |
| 2010/0074094 | A1 | 3/2010 | Sakamoto et al. |
| 2010/0226240 | A1 | 9/2010 | Jiko et al. |
| 2011/0003168 | A1 | 1/2011 | Jiko et al. |
| 2011/0042135 | A1 | 2/2011 | Tauchi et al. |

FOREIGN PATENT DOCUMENTS

| | | |
|---|---|---|
| JP | 2 58742 | 2/1990 |
| JP | 4 6269 | 1/1992 |
| JP | 4 28032 | 1/1992 |
| JP | 4 252440 | 9/1992 |
| JP | 5 258363 | 10/1993 |
| JP | 5 334727 | 12/1993 |
| JP | 6 208732 | 7/1994 |
| JP | 6 302027 | 10/1994 |
| JP | 7 62919 | 7/1995 |
| JP | 2000 57627 | 2/2000 |
| JP | 2001 184725 | 7/2001 |
| JP | 2003 6929 | 1/2003 |
| JP | 2003 160826 | 6/2003 |
| JP | 2003 173576 | 6/2003 |
| JP | 2004 158145 | 6/2004 |
| JP | 2007 66417 | 3/2007 |
| TW | 200746133 | 12/2007 |
| WO | 98 09823 | 3/1998 |

OTHER PUBLICATIONS

U.S. Appl. No. 13/257,767, filed Sep. 20, 2011, Shida, et al.
U.S. Appl. No. 13/128,415, filed May 10, 2011, Tauchi, et al.
Taiwanese Office Action issud Oct. 25, 2012, in Taiwan Patent Application No. 098130751 (with English translation).

* cited by examiner

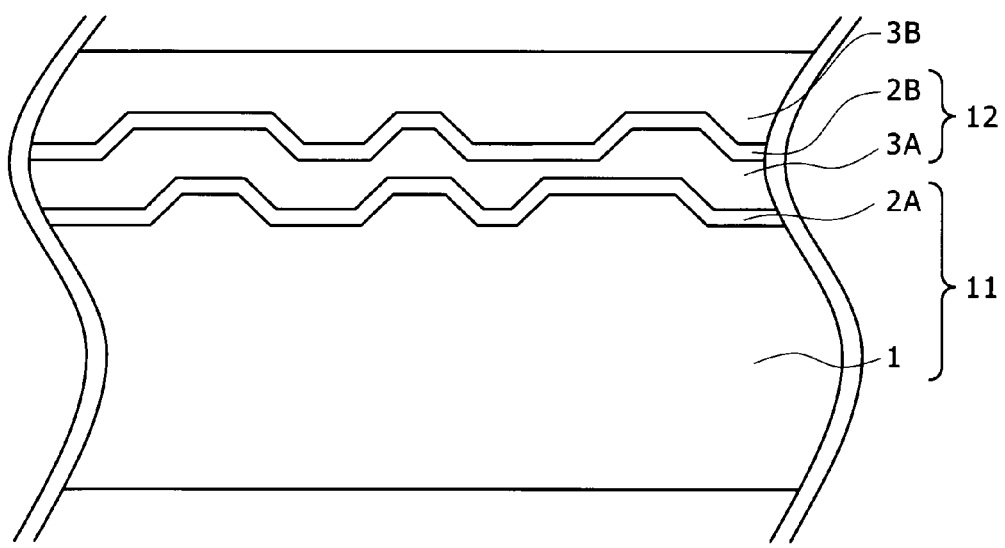

READ-ONLY OPTICAL INFORMATION RECORDING MEDIUM AND SPUTTERING TARGET FOR DEPOSITING REFLECTIVE FILM FOR THE OPTICAL INFORMATION RECORDING MEDIUM

TECHNICAL FIELD

The present invention relates to a read-only optical information recording medium, such as a read-only Blu-ray Disc (BD), from which information is read with a blue laser beam. The present invention also relates to a sputtering target for depositing a reflective film for use in the optical information recording medium.

BACKGROUND ART

Optical information recording media (optical discs) are classified as three types, i.e., read-only, write-once read-many, and rewritable optical discs, by the principle of writing and reading.

FIG. 1 schematically shows a representative structure of a read-only optical information recording medium (single-layer optical disc). As shown in FIG. 1, the read-only optical information recording medium has a structure including a substrate made typically of a transparent plastic; and sequentially arranged thereon, a reflective film 2 typically containing Ag, Al, or Au as a main component, and a light transmissive layer 3. On the substrate 1, projections and depressions called "lands and pits" are recorded in combination as information. Typically, a polycarbonate substrate having a thickness of 1.1 mm and a diameter of 12 cm is used as the substrate 1. The light transmissive layer 3 is formed typically by coating and curing a light transmissive resin (optically transparent resin). The reading of the recorded data is performed by detecting the phase difference or reflection difference of a laser beam applied to the optical disc.

FIG. 1 shows a single-layer optical disc in which one pair of the reflective film 2 and the light transmissive layer 3 is formed on the substrate 1 bearing the recorded information based on the projecting/depressed lands and pits (recorded data). Independently, use is also made of a double-layer optical disc which includes a first information recording face 11 and a second information recording face 12, as illustrated in FIG. 2. Specifically, the double-layer optical disc illustrated in FIG. 2 has a structure in which a first reflective film 2A, a first light transmissive layer 3A, a second reflective film 2B, and a second light transmissive layer 3B are successively laminated on a substrate 1 on which the information based on a combination of the projecting/depressed lands and pits (recorded data) is recorded. In the first light transmissive layer 3A, information different from the information recorded on the substrate 1 is recorded based on a combination of lands and pits.

Reflective films made of Au, Cu, Ag, Al, or an alloy containing any of these elements as a main component have been generally used as the reflective films for use in optical discs.

Among them, a reflective film containing Au as a main component has the advantages of excellent chemical stability (durability) and small aged deterioration in recording characteristics, but is extremely expensive and suffers from an insufficiently high reflectance with respect to a blue laser beam (at a wavelength of 405 nm) used for writing and reading information typically to and from a BD. A reflective film containing Cu as a main component is inexpensive, but poorest in chemical stability among the customary reflective film materials. In addition, the Cu-based reflective film has a drawback of a low reflectivity to a blue laser beam, similarly to the Au-based reflective film, so that the use thereof is limited. In contrast, a reflective film containing Ag as a main component shows a sufficiently high reflectivity to light at a wavelength in the range of 400 to 800 nm which is a practically used wavelength region, and also has excellent chemical stability. Therefore, the Ag-based reflective film is now widely used in optical discs using a blue laser beam.

Aluminum (Al) shows a sufficiently high reflectance to light at a wavelength of 405 nm and is inexpensive in comparison to Ag and Au, but the Al-based reflective film is inferior in chemical stability to the Ag- or Au-based reflective films. Accordingly, the reflective film should have a sufficiently large thickness so as to ensure sufficient durability, and, in the case of applying the Al-based reflective film typically to a DVD-ROM, the reflective film is designed to have a sufficiently large thickness at a level of approximately 40 nm so as to improve durability.

However, such a reflective film should have a small thickness in some cases. Specifically, with reference to FIG. 2, the reflective film 2A, i.e., the reflective film closest to the substrate 1 (hereinafter such a reflective film closest to the substrate is also specifically referred to as a "first reflective film"), is initially formed, and subsequently the light transmissive layer 3A is formed on the reflective film 2A in some manufacturing processes typically of double-layer BD-ROMs. The light transmissive layer 3A is formed by uniformly applying a photo-curable resin to the reflective film 2A, and applying light from the substrate 1 side through the reflective film 2A to the photo-curable resin to cure the resin. In these cases, the first reflective film should have optical transparency at a certain level, and for this purpose, the first reflective film should have a small thickness typically of 30 nm or less. However, such a thin Al-based reflective film suffers from increased jitter (fluctuations or variations of reading signals on time base) and/or insufficient reflectance due to aged deterioration of the reflective film, although the reflective film shows satisfactory characteristic properties immediately after its preparation.

As techniques using an Al-based alloy in a reflective film of an optical disc, Patent Literature (PTL) 1, for example, discloses a reflective film composed of an Al alloy containing a rare-earth element in a content of 0.05 to 3 atomic percent, in which the rare-earth element includes yttrium (Y), neodymium (Nd), and gadolinium (Gd).

PTL 2 discloses a reflective film for an optical recording medium, which is composed of an Al alloy containing Mg in a content of 0.1 to 15 percent by mass and further containing, according to necessity, one or more of rare-earth elements in a total content of 0.1 to 10 percent by mass, with the remainder being Al and inevitable impurities, in which the inevitable impurities are contained in a content of 100 ppm or less. PTL 3 discloses, as its working example, an optical disc including an Al reflective film (having a thickness of 100 nm) containing Ta in a content of 4%. This optical disc is described as a read-only optical disc having satisfactory durability even under conditions where the temperature and/or humidity abruptly changes.

However, both the reflective film disclosed in the working example of PTL 1 and the reflective film disclosed in PTL 2 have large thicknesses of 40 nm and 100 nm, respectively. In addition, the reflective film as deposited in the working example of PTL 3 has a thickness of 100 nm. Accordingly, none of these reflective films is intended to use as a "first reflective film" which should have satisfactory optical transparency in the manufacturing process as mentioned above.

Independently, PTL 4 discusses the composition of an Al-based alloy which gives a semi-transmissive reflective layer having a predetermined transmittance and reflectance and excelling in chemical stability such as corrosion resistance and aggregation resistance. The technique disclosed in PTL 4 is, however, intended to give a semi-transmissive reflective layer as described above but does not relate to a first reflective film requiring a sufficient reflectance.

CITATION LIST

Patent Literature

PTL 1: U.S. Pat. No. 5,643,650
PTL 2: JP-A No. 66417/2007
PTL 3: JP-B No. 62919/1995
PTL 4: JP-A No. 173576/2003

SUMMARY OF INVENTION

Technical Problem

Under these circumstances, an object of the present invention is to provide a read-only optical information recording medium (such as a BD-ROM) bearing information readable with a blue laser beam and including a reflective film (first reflective film) which has a sufficiently high reflectance while ensuring satisfactory optical transparency necessary in manufacturing, and which has excellent reading stability and excellent durability when used in the optical information recording medium. Another object of the present invention is to provide a sputtering target for depositing the reflective film.

Solution to Problem

Summary of the present invention will be illustrated below.
(1) A read-only optical information recording medium which has a structure including a substrate; and two or more assemblies of a reflective film and a light transmissive layer, the assemblies being sequentially present on the substrate, and the optical information recording medium further includes information readable with a blue laser beam,
in which, of the reflective films, a reflective film being closest to the substrate substantially includes an Al-based alloy containing Ti in a content of 0.5 to 3.0 atomic percent and has a thickness of 10 nm or more and 30 nm or less.
(2) The read-only optical information recording medium according to Item (1), in which the Al-based alloy further contains at least one element selected from the group consisting of Ge, La, and Ag in a total content of 0.1 to 1.5 atomic percent.
(3) A sputtering target for depositing a reflective film for a read-only optical information recording medium, in which the read-only optical information recording medium has a structure including a substrate; and two or more assemblies of a reflective film and a light transmissive layer, the assemblies are sequentially present on the substrate, the optical information recording medium further includes information readable with a blue laser beam, and the sputtering target is used for depositing a reflective film closest to the substrate, in which the sputtering target substantially includes an Al-based alloy containing Ti in a content of 0.5 to 3.0 atomic percent.
(4) The sputtering target for depositing a reflective film for a read-only optical information recording medium, according to Item (3), in which the Al-based alloy further contains at least one element selected from the group consisting of Ge, La, and Ag in a total content of 0.1 to 1.5 atomic percent.

In a preferred embodiment, the read-only optical information recording medium according to Item (1) is a read-only optical information recording medium which has a structure including a substrate; and two or more assemblies of a reflective film and a light transmissive layer, the assemblies are sequentially present on the substrate, and the optical information recording medium further includes information readable with a blue laser beam, in which, of the reflective films, a reflective film being closest to the substrate is composed of an Al-based alloy containing Ti in a content of 0.5 to 3.0 atomic percent and has a thickness of 10 nm or more and 30 nm or less.

In another preferred embodiment, the sputtering target for depositing a reflective film for a read-only optical information recording medium, according to Item (3), is a sputtering target for depositing a reflective film for a read-only optical information recording medium, in which the read-only optical information recording medium has a structure including a substrate; and two or more assemblies of a reflective film and a light transmissive layer, the assemblies are sequentially present on the substrate, the optical information recording medium further includes information readable with a blue laser beam, and the sputtering target is used for depositing the reflective film closest to the substrate, in which the sputtering target is composed of an Al-based alloy containing Ti in a content of 0.5 to 3.0 atomic percent.

Advantageous Effects of Invention

The present invention provides a read-only optical information recording medium, in which a resin for constituting a light transmissive layer can be cured satisfactorily in the manufacturing process thereof, and the resulting optical information recording medium shows a high reflectance and low jitter and has very excellent signal writing/reading properties (reading stability). The present invention further provides, in a preferred embodiment, a read-only optical information recording medium which shows a high reflectance and low jitter even after an accelerated environmental test and thereby has excellent durability. In addition, the present invention provides a read-only optical information recording medium whose manufacturing cost is lower than that of a customary optical information recording medium using a Ag alloy.

The optical information recording medium according to the present invention is advantageously usable especially in optical information recording media (optical discs) such as BD-ROMs (of which double-layer BD-ROMs are more preferred) bearing information readable with a blue laser beam.

As used herein the term (having) "excellent reading stability" refers to "having an initial jitter of 9% or less", as described in working examples later. The term (having) "excellent durability" refers to "having a loss in reflectance [(reflectance after an accelerated environmental test)−(reflectance before the test)] of 5.0% or less (absolute value) after an accelerated environmental test and has a jitter of 9% or less both before and after the accelerated environmental test, in which the accelerated environmental test is performed by holding the sample in an environment at a temperature of 80° C. and relative humidity of about 85% for 192 hours, as described in the after-mentioned working examples.

BRIEF DESCRIPTION OF DRAWINGS

FIG. 2 is a cross-sectional view schematically illustrating an essential part in a circumferential direction of another read-only optical information recording medium (double-layer optical disc).

DESCRIPTION OF EMBODIMENTS

Figure 1:
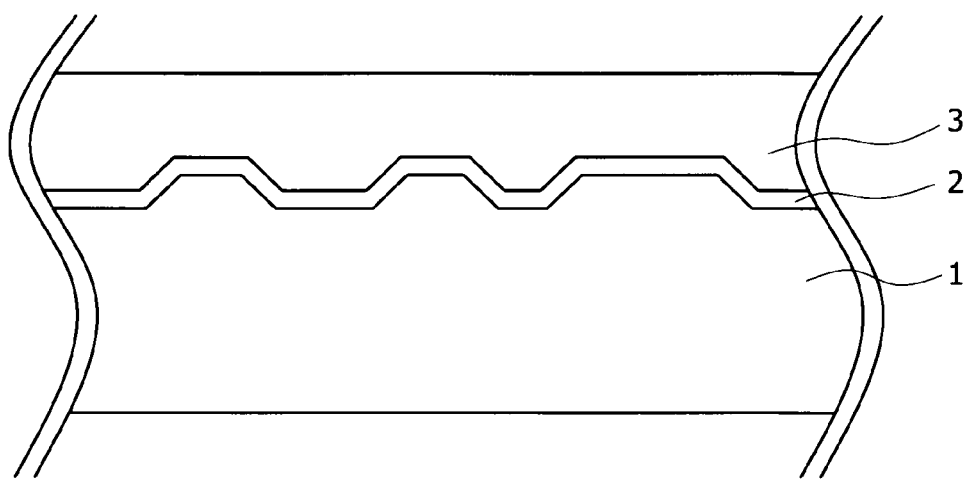
FIG. 1 is a cross-sectional view schematically illustrating an essential part in a circumferential direction of a read-only optical information recording medium (single-layer optical disc).

The present inventors made intensive investigations to provide a reflective film (first reflective film) present at a position closest to a substrate in an optical disc having two or more information recording faces, which reflective film shows:

a reflectance at a certain level as a total-reflective film; and such optical transparency as to allow a resin for the formation of a light transmissive layer to be cured by the action of light sufficiently when the light transmissive layer is formed on the first reflective film, and the light is applied from the substrate surface through the first reflective film to the light transmissive layer. Initially, they investigated about the thickness of the first reflective film.

As a result, the present inventors found that the first reflective film, if having an excessively small thickness, fails to provide a sufficient signal strength to read information from the disc, because such thin first reflective film transmits light in a larger amount, and thus reflects light in a smaller amount. For this reason, the first reflective film herein is specified to have a thickness of 10 nm or more, so as to surely have an initial reflectance of 70.0% or more, as described in the after-mentioned working examples. In contrast, the first reflective film, if having a thickness of more than 30 nm, has an excessively low light transmittance and thereby transmits an insufficient amount of light (such as an ultraviolet ray) when the light is applied from the substrate side for the formation of the light transmissive layer, and this impedes sufficient curing of the resin for constituting the light transmissive layer. In addition, the optical information recording medium including this first reflective film shows larger jitter in early stages after its manufacturing. For these reasons, the upper limit of the thickness of the first reflective film is herein specified to be 30 nm. The upper limit is preferably 25 nm or less, and more preferably 20 nm or less.

The present inventors decided that the first reflective film has a thickness in the range of 10 to 30 nm from the above viewpoints, and they considered that the reflective film, if having such a small thickness, may often show insufficient durability. To avoid this problem, they have made further investigations on the chemical composition of the Al-based alloy constituting the reflective film so as to improve the durability of the reflective film. Initially, to develop a novel Al-based alloy, they have made investigations on the behavior of a pure Al film about how the reading stability and durability vary depending on the thickness of the reflective film.

Specifically, pure Al films having different thicknesses were deposited using a pure Al sputtering target, and the initial reflectances of the respective pure Al films were measured, the respective pure Al films were then subjected to the accelerated environmental test, and the reflectances after the test were measured. Based on these, how the reflectance and transmittance of the pure Al films vary due to aged deterioration was determined as durability. Independently, single-layer BD-ROM discs were prepared by depositing pure Al films having different thicknesses respectively on a polycarbonate substrate bearing lands and pits thereon using the pure Al sputtering target; and forming a light transmissive layer of an ultraviolet-curable resin on each pure Al film. Next, jitters of the discs immediately after preparation were measured, the discs were then subjected to the accelerated environmental test, and jitters after the test were measured. Thus, the durability of the discs was evaluated from the viewpoint of jitter.

As a result, the present inventors have found that, when a pure Al film is formed as a reflective film of a BD-ROM, the BD-ROM shows increased jitter when the reflective film has a thickness of 15 nm or more; and that, in contrast to this, the BD-ROM has low jitter but shows an insufficient reflectance when the reflective film has a thickness of about 15 nm or less. They have also found that the BD-ROM shows increased jitter and a significantly lower reflectance when the BD-ROM is subjected to a durability test. The durability test is an accelerated environmental test in which the disc is held in high temperature and humidity surroundings at a temperature of 80° C. and relative humidity of about 85%.

Based on these results, the present inventors have further made investigations on the chemical composition of the reflective film to provide a reflective film which has excellent reading stability and excellent durability even when having such a small thickness as specified above. As a result, they have found that the addition of Ti to Al allows the resulting Al alloy film to have a high initial reflectance equivalent to that of the pure Al film, is protected from increasing in jitter and deterioration in reflectance each due to aged deterioration, and, above all, is protected from increasing in jitter.

Although reasons remaining unknown, the increase in jitter is sufficiently suppressed by the addition of Ti, probably because the addition of Ti to the pure Al helps the Al-based thin film to have a fine crystalline structure, allows the optical information recording medium to have satisfactorily low jitter in early stages after the manufacturing thereof, suppresses the interdiffusion of Al atoms to suppress the surface roughness to be increased due to growth of Al grains, resulting in suppression of aged deterioration in jitter.

To exhibit these advantageous effects sufficiently, the Al alloy should contain Ti in an amount of 0.5% ("%" in the composition means "atomic percent", unless otherwise specified; hereinafter the same) or more. If the Ti content is below this level, the jitter of the reflective film is not sufficiently effectively suppressed and is increased due to aged deterioration, thus being undesirable. The Ti content is preferably 1.0% or more.

In contrast, the reflective film, if containing Ti in a content of more than 3.0%, has a higher absorptivity and thereby fails to transmit light in a sufficient transmittance to cure the light transmissive layer with the light. For these reasons, the upper limit of the Ti content is specified to be 3.0%. The upper limit is preferably 2.5%.

The first reflective film in the present invention is preferably composed of an Al-based alloy further containing, in addition to Ti, at least one element selected from the group consisting of Ge, La, and Ag in a total content of 0.1% to 1.5%. This reflective film is further resistant to reduction in reflectance due to aged deterioration, and thereby allows the optical disc to have further higher durability.

Although the mechanism remaining unknown, the elements (Ge, La, and Ag) exhibit the above-mentioned operation and effects probably because these elements are oxidized or enriched in the surface of the film, thereby suppresses oxygen from invading the Al matrix, and protects Al from being oxidized. To exhibit these advantageous effects sufficiently, the Al-based alloy contains at least one of these elements preferably in a total content of 0.1% or more and more preferably in a total content of 0.2% or more. In contrast, the reflective film, if containing these elements in a total content of more than 1.5%, may become susceptible to reduction in reflectance contrarily, thus being undesirable. This is probably because the added elements are oxidized to increase the transmittance of the reflective film and/or form compounds with Al to cause the reflective film to have a higher absorptivity. The total content of these elements is more preferably 1.0% or less.

The Al-based alloy for constituting the first reflective film for use in the present invention has such a chemical composition as described above, with the remainder being substantially Al. In this connection, the Al-based alloy may be contaminated with inevitable impurities such as oxygen (O), carbon (C), hydrogen (H), nitrogen (N), iron (Fe), and silicon (Si) typically during the manufacturing of the first reflective film. However, the chemical composition of the first reflective film in the present invention is not specified on such trace components inevitably contaminated, and that the reflective film may contain trace amounts of such inevitable impurities, as long as not adversely affecting the characteristic properties according to the present invention. Specifically, the first reflective film for use in the present invention substantially includes the Al alloy, with these trace inevitable impurities as possibly contaminated components.

The read-only optical information recording medium according to the present invention may be manufactured according to any process not especially limited. However, typically in the case of a double-layer BD-ROM, the BD-ROM is preferably manufactured by a manufacturing process of depositing the reflective film 2A in FIG. 2 as the first reflective film in the present invention; and forming the light transmissive layer 3A to be arranged on the reflective film 2A, which process includes the step of uniformly applying a photo-curable resin on the reflective film 2A and applying light (such as an ultraviolet ray) from the substrate 1 side through the first reflective film to the applied photo-curable resin to form the light transmissive layer. This allows the advantageous effects of the present invention to be exhibited further sufficiently and is desirable.

The read-only optical information recording medium according to the present invention has a feature in adopting the Al-based alloy to, of two or more reflective films thereof, a reflective film closest to the substrate in an optical disc having two or more information recording faces as illustrated in FIG. 2. Accordingly, of the two or more reflective films in the optical disc having two or more information recording faces, the other reflective film(s) than the first reflective film is not limited typically in its composition, as long as satisfying required characteristic properties. In addition, the other components (types typically of the light transmissive layer and substrate) in the optical disc are not especially limited and can adopt generally used ones.

Typically, exemplary materials for the substrate usable herein include resins generally used in optical disc substrates, such as polycarbonate resins and acrylic resins. Among them, polycarbonates are preferably used in view typically of cost and mechanical properties.

The substrate may have a thickness in the range of about 0.5 to 1.2 mm. Pits formed on the substrate have depths preferably in the range of about 50 to 100 nm.

The light transmissive layers are also not limited in type, and exemplary materials therefor include ultraviolet-curable resins and polycarbonate resins. The light transmissive layer in a single-layer optical disc has a thickness of preferably about 100 µm. In a double-layer optical disc, the first light transmissive layer has a thickness of preferably about 25 µm and the second light transmissive layer has a thickness of preferably about 75 µm.

The first reflective film in the present invention can be deposited typically through sputtering or vapor deposition but is preferably deposited through sputtering. This is because the sputtering allows the alloy element(s) to be uniformly dispersed in the Al matrix and allows the resulting film to be uniform and to show stable optical properties and stable durability.

Though conditions are not especially limited, the film deposition through sputtering is preferably performed typically under the following conditions:
Substrate Temperature: room temperature to 50° C.
Base Pressure: $1 \times 10^{-5}$ Torr or less ($1 \times 10^{-3}$ Pa or less)
Gas Pressure During Film Deposition: 1 to 4 mTorr
DC Sputtering Power Density (DC sputtering power per unit area of the target): 1.0 to 20 W/cm$^2$ The sputtering target for use in sputtering can be prepared according to any process such as melting/casting, powder sintering, or spray forming, but is preferably prepared according to vacuum melting/casting or spray forming. An Al-based alloy sputtering target prepared through vacuum melting/casting contains less amounts of impurities such as nitrogen and oxygen and, when used for the film deposition, allows the sputtering to proceed at a stable rate and gives a thin film having a highly uniform composition. Independently, a sputtering target prepared through spray forming has a highly uniform composition and, when used for the film deposition, gives a thin film which has a highly uniform thickness and a highly uniform composition.

The first reflective film is deposited preferably by using a sputtering target, which sputtering target is composed of an Al-based alloy having basically the same alloy composition as that of the reflective film, in which the Al-based alloy constituting the sputtering target contains Ti in a content of 0.5% to 3.0% for depositing a reflective film composed of an Al alloy (Al-based alloy) containing Ti in a content of 0.5% to 3.0%; or the Al-based alloy constituting the sputtering target contains Ti in a content of 0.5% to 3.0% and further contains at least one element selected from the group consisting of Ge, La, and Ag in a total content of 0.1% to 1.5% for depositing a reflective film composed of the Al-based alloy further containing at least one element selected from the group consisting of Ge, La, and Ag in a total content of 0.1% to 1.5%. The use of the sputtering target allows easy deposition of the first reflective film having a desired composition.

The Al-based alloy for constituting the sputtering target according to the present invention has such a chemical composition as described above, with the remainder being substantially Al. In this connection, the Al-based alloy may be contaminated with inevitable impurities such as oxygen (O), carbon (C), hydrogen (H), nitrogen (N), iron (Fe), and silicon (Si) typically during the manufacturing of the sputtering target. However, the chemical composition of the sputtering target according to the present invention is not specified on such trace components inevitably contaminated, and the sputtering target may contain trace amounts of such inevitable impurities, as long as not adversely affecting the characteristic properties according to the present invention. Specifically, the sputtering target according to the present invention substantially includes the Al alloy, with these trace inevitable impurities as possibly contaminated components.

Example

The present invention will be illustrated in further detail with reference to several working examples below. It should be noted, however, that these examples are never intended to limit the scope of the present invention; various alternations and modifications may be made without departing from the scope and spirit of the present invention and all fall within the scope of the present invention. Specifically, samples each having one pair of a reflective film and a light transmissive layer alone were prepared in the following working examples, but it should be noted that these samples were prepared for the evaluation of characteristic properties of the first reflective film in a double-layer optical disc.

(1) Re: Initial Reflectance and Change in Reflectance Before and After Accelerated Environmental Test Samples for the measurement of reflectance were prepared by depositing a pure Al reflective film and a series of Al-based alloy reflective films each having a thickness of about 18 nm respectively on a polycarbonate substrate with a specular surface through direct-current (DC) magnetron sputtering. Sputtering equipment used herein was a multiple-sputtering equipment (CS-200 supplied by ULVAC, Inc.) which allows simultaneous discharge to two or more targets. The sputtering was performed using a pure Al target, an Al—Ti alloy target, an Al—Ti—Ge alloy target, and a composite target of a pure Al target on which a pure metal chip as an alloy element is mounted, respectively.

The sputtering was performed under conditions of an Ar gas flow rate of 20 sccm, an Ar gas power of about 0.1 Pa, a film deposition power of 2 to 5 W/cm$^2$, and a base pressure of $2.0 \times 10^{-6}$ Torr or less. The chemical compositions (Table 1) of the deposited Al-based alloy films were determined through inductively coupled plasma (ICP) atomic emission spectrometry and inductively coupled plasma (ICP) mass spectrometry.

Initial reflectances of the above-prepared samples were measured at a wavelength of 405 nm using a spectrophotometer (V-570 supplied by JASCO Corporation). The samples were then subjected to constant temperature and humidity tests (accelerated environmental tests) of holding in an air atmosphere at a temperature of 80° C. and relative humidity of 85% for 192 hours, and reflectances of the samples after the tests were measured. Based on these data, losses in reflectance [(reflectance after the test)−(reflectance before the test)] were determined. A sample having a loss in reflectance of 5.0% or less (absolute value), an initial reflectance (reflectance before the test) of 70.0% or more, and a reflectance after the test of 68.0% or more was accepted herein.

(2) Re: Jitters Before and After Accelerated Environmental Test

Initially, a pure Al reflective film and a series of Al-based alloy reflective films having the chemical compositions given in Table 1 and having a thickness of 18 nm were deposited on a polycarbonate BD-ROM substrate bearing lands and pits and having a thickness of 1.1 mm through DC magnetron sputtering. The sputtering was performed using a pure Al target, a composite target of pure Al target on which a chip of pure metal as an alloy element is mounted, and an Al alloy target, respectively. The film deposition was performed using the same equipment under the same conditions as in above (1).

Next, a light transmissive layer was formed on each of the above-prepared reflective films by applying an ultraviolet-curable resin to a thickness of 100 μm through spin coating, and applying an ultraviolet ray from the substrate side to cure the resin. Thus, a series of single-layer BD-ROMs including the reflective films of different compositions was prepared.

Jitters were then measured using ODU-1000 supplied by Pulstec Industrial Co., Ltd. and TA-810 supplied by Yokogawa Electric Corporation under the following conditions:

Reading Laser Power: 0.35 mW

Disc Rotation Speed: 4.92 m/s

Next, the samples were subjected to accelerated environmental tests by the procedure of (1), and jitters after the tests were measured. A sample having a jitter before the test and a jitter after the test of both 9% or less was evaluated as having "excellent durability" (having excellent reading stability over a long period of time).

Samples Nos. 19 to 21 in Table 1 do not satisfy all the criteria on the initial reflectance, the reflectance after the test, and the loss in reflectance, and were thereby not subjected to measurements of jitters.

The results are also shown in Table 1.

TABLE 1

| Sample Number | Chemical composition of reflective film* | Initial reflectance (%) | Reflectance after accelerated environmental test (%) | Loss in reflectance caused by accelerated environmental test (%) | Initial jitter (%) | Jitter after accelerated environmental test (%) |
|---|---|---|---|---|---|---|
| 1 | pure Al | 71.9 | 63.9 | −8.0 | 7.5 | 14.5 |
| 2 | Al—0.5Ti | 77.2 | 71.2 | −6.0 | 7.7 | 7.9 |
| 3 | Al—2.9Ti | 74.3 | 69.4 | −4.9 | 7.5 | 7.2 |
| 4 | Al—4.0Ti | 65.6 | 60.1 | −5.5 | 7.0 | 6.5 |
| 5 | Al—1.0Ti—0.5Ge | 76.4 | 73.7 | −2.7 | 7.9 | 7.4 |
| 6 | Al—1.0Ti—1.0Ge | 76.3 | 72.8 | −3.5 | 8.0 | 7.3 |
| 7 | Al—1.0Ti—1.5Ge | 77.3 | 73.2 | −4.1 | 8.4 | 7.7 |
| 8 | Al—1.0Ti—0.5La | 75.3 | 71.2 | −4.1 | 8.3 | 7.3 |
| 9 | Al—1.0Ti—1.0La | 75.3 | 70.8 | −4.5 | 8.6 | 7.2 |
| 10 | Al—1.0Ti—1.5La | 74.6 | 69.7 | −4.9 | 8.0 | 7.0 |
| 11 | Al—1.0Ti—1.0Ce | 77.7 | 72.1 | −5.6 | 8.4 | 7.5 |
| 12 | Al—1.0Ti—0.5Ag | 76.1 | 71.8 | −4.3 | 7.9 | 7.1 |
| 13 | Al—1.0Ti—1.0Ag | 78.3 | 73.4 | −4.9 | 8.1 | 7.2 |
| 14 | Al—1.0Ti—1.5Ag | 76.4 | 71.0 | −5.4 | 7.9 | 7.1 |
| 15 | Al—1.0Ti—1.5Cu | 78.8 | 73.2 | −5.6 | 7.7 | 7.0 |
| 16 | Al—1Ti—4.1Ge | 69.8 | 65.4 | −4.4 | 6.9 | 6.8 |
| 17 | Al—1Ti—3.0La | 70.6 | 65.4 | −5.2 | 6.7 | 7.0 |
| 18 | Al—1Nd—1Ta | 75.2 | 67.9 | −7.3 | 7.6 | 6.7 |
| 19 | Al—2.4Mo | 65.8 | 57.8 | −8.0 | — | — |
| 20 | Al—3.6W | 64.1 | 56.3 | −7.8 | — | — |
| 21 | Al—4.1Mn | 64.6 | 50.7 | −13.9 | — | — |

*The figures represent the contents (atomic percent) of respective alloy components in the Al-based alloy film.

Table 1 demonstrates as follows. Specifically, Table 1 demonstrates that the reflective films composed of Al-based alloys containing specific element(s) in specific amount(s) as specified in the present invention had high initial reflectances, were protected from substantial reduction in reflectance even after the accelerated environmental tests, and showed excellent durability; and that optical discs using these reflective films had excellent reading stability in terms of a low initial jitter and had excellent durability in terms of a low jitter after the accelerated environmental tests, thus exhibiting excellent reading stability over a long period of time.

In contrast, the pure Al film, the Al-based alloy films not containing the specific composition specified in the present invention, and the Al-based alloy films containing the specific composition but in a content out of the specific range specified in the present invention failed to show a high reflectance, or suffered from deterioration in durability, as they suffered from reduction in reflectance due to the accelerated environmental tests or suffered from increased jitter after the accelerated environmental tests.

Specifically, Sample No. 1 included the reflective film composed of the pure Al film, thereby had poor durability, and, after the accelerated environmental test, showed a remarkably reduced reflectance and an increased jitter.

Sample No. 16 contained Ge as a third element but in an excessively high content and thereby showed a somewhat low initial reflectance. Sample No. 17 contained La as a third element but in an excessively high content and thereby showed a somewhat low reflectance after the accelerated environmental test. Sample No. 18 contained Nd and Ta being not the specific elements specified in the present invention and showed a remarkably large loss in reflectance. Samples Nos. 19 to 21 did not have the composition as specified in the present invention (namely, did not contain, as an alloy element, at least Ti in a content of 0.5% to 3.0%), thereby showed a low initial reflectance and a large loss in reflectance.

While the present invention has been described with reference to the specific embodiments thereof, it is obvious to those skilled in the art that various changes and modifications can be made in the present invention without departing from the spirit and scope of the present invention.

The present application is based on Japanese Patent Application No. 2008-233917 filed on Sep. 11, 2008, the entire contents of which are incorporated herein by reference.

INDUSTRIAL APPLICABILITY

The present invention provides a read-only optical information recording medium, in which a resin for constituting a light transmissive layer can be cured satisfactorily in the manufacturing process thereof, and the resulting optical information recording medium shows a high reflectance and low jitter and has very excellent signal writing/reading properties (reading stability). The present invention further provides, in a preferred embodiment, a read-only optical information recording medium which shows a high reflectance and low jitter even after an accelerated environmental test and thereby has excellent durability. In addition, the present invention provides a read-only optical information recording medium whose manufacturing cost is lower than that of a customary optical information recording medium using a Ag alloy.

The optical information recording medium according to the present invention is advantageously usable especially in optical information recording media (optical discs) such as BD-ROMs (of which double-layer BD-ROMs are more preferred) bearing information readable with a blue laser beam.

REFERENCE SIGNS LIST

| | |
|---|---|
| 1 | substrate |
| 2 | reflective film |
| 3 | light transmissive layer |
| 2A | first reflective film |
| 2B | second reflective film |
| 3A | first light transmissive layer |
| 3B | second light transmissive layer |
| 11 | first information recording face |
| 12 | second information recording face |

The invention claimed is:

1. A read-only optical information recording medium, comprising:
    a substrate;
    a first assembly comprising a first reflective film and a first light transmissive layer formed on the substrate; and
    a second assembly comprising a second reflective film and a second light transmissive layer formed on the first assembly;
    wherein:
    the optical information recording medium comprises information readable with a blue laser beam;
    the first reflective film comprises an aluminum (Al)-based alloy comprising titanium (Ti) in an amount of 0.5 to 3.0 atomic percent; and
    the first reflective film has a thickness of from 10 nm to 30 nm.

2. The read-only optical information recording medium according to claim 1, wherein the Al-based alloy further comprises at least one element selected from the group consisting of germanium (Ge), lanthanum (La), and silver (Ag), in a total amount of 0.1 to 1.5 atomic percent.

3. The read-only optical information recording medium according to claim 1, wherein the aluminum (Al)-based alloy comprises titanium (Ti) in an amount of 1.0 to 3.0 atomic percent.

4. The read-only optical information recording medium according to claim 1, wherein the aluminum (Al)-based alloy comprises titanium (Ti) in an amount of 0.5 to 2.5 atomic percent.

5. The read-only optical information recording medium according to claim 1, wherein the aluminum (Al)-based alloy comprises titanium (Ti) in an amount of 1.0 to 2.5 atomic percent.

6. The read-only optical information recording medium according to claim 1, wherein the first reflective film has a thickness of from 10 nm to 25 nm.

7. The read-only optical information recording medium according to claim 1, wherein the first reflective film has a thickness of from 10 nm to 20 nm.

8. The read-only optical information recording medium according to claim 2, wherein the Al-based alloy further comprises at least one element selected from the group consisting of germanium (Ge), lanthanum (La), and silver (Ag), in a total amount of 0.2 to 1.5 atomic percent.

9. The read-only optical information recording medium according to claim 2, wherein the Al-based alloy further comprises at least one element selected from the group consisting of germanium (Ge), lanthanum (La), and silver (Ag), in a total amount of 0.1 to 1.0 atomic percent.

10. A method of manufacturing the read-only optical information recording medium according to claim 1, comprising depositing the first reflecting film by sputtering with a sputtering target;
    wherein the sputtering target comprises an Al-based alloy comprising Ti in an amount of 0.5 to 3.0 atomic percent.

11. The method according to claim 10, wherein the Al-based alloy further comprises at least one element selected from the group consisting of Ge, La, and Ag, in a total amount of 0.1 to 1.5 atomic percent.

* * * * *